UNITED STATES PATENT OFFICE.

GEORGE S. LEE, OF DENVER, COLORADO.

COMPOSITION OF MATTER FOR PAVING.

SPECIFICATION forming part of Letters Patent No. 392,614, dated November 13, 1888.

Application filed November 22, 1887. Serial No. 255,911. (No specimens.)

*To all whom it may concern:*

Be it known that I, GEORGE S. LEE, a citizen of the United States, residing at Denver, in the county of Arapahoe and State of Colorado, have invented new and useful Improvements in a Composition of Matter for Paving, &c., of which the following is a specification.

The asphaltic compounds hitherto used for paving, consisting, essentially, of broken or crushed rock, gravel, or sand and asphalt, with small percentage of other materials added thereto, have not proved as perfect and lasting as might be desired. If it be attempted to use as a top or wearing surface a comparatively coarse composition—that is, one having the rock or gravel portion thereof of some size, even only of such size as would pass through one or two inch rings—the asphalt matrix or cement being much the softer and more susceptible to grinding and wear than is the embedded rock or gravel, wears away faster than the rock or gravel, leaving the latter projecting above the general level, making a rough and unpleasant traveling-surface, or else by the concussion of wheels, &c., such projecting portions are loosened and knocked from out the matrix, leaving pits which are rapidly increased into holes by the grinding and wearing upon their edges, so that frequent repairs would be necessitated. If to avoid such difficulties a finer composition—one in which the mineral portion is sand or finely-comminuted rock—is used for the top or wearing surface the layer exposed to the greatest, in fact, to all the wear and tear of traffic has the least wearing capacity, and from its very nature is rapidly ground away, the components being already reduced to a condition most favorable to such grinding and wearing away, whereby frequent resurfacing is rendered necessary. It is also well known that such surfaces made of asphaltum and finely-comminuted mineral, either rock or sand, become exceedingly slippery in wet or snowy weather, the moisture in effect glazing them so that they become exceedingly dangerous to animals traveling thereon.

Again, for the manufacture of an ideal and perfect asphaltic pavement all traces of moisture should be eliminated from the compound and from its constituents, for it is well known that any dampness or moisture whatever militates against a perfect uniform combination of asphalt with other materials and prevents their thorough cementing. The rock material or mineral used generally is more or less porous, (as is all rock,) and therefore susceptible to moisture and to become more or less charged therewith, while there is always some water in the very composition of the rock itself.

The object of my invention, therefore, is to provide a composition for the manufacture of roadways and pavements free from these objections, which shall be impervious to water, economical in first cost, easily prepared and laid, of uniform structure, so as to guarantee even and equal wear, of a smooth surface, yet one safe for travel under all circumstances; and to these ends it consists in the composition more fully hereinafter described and claimed.

As the base of my improved composition I use what is known at smelters and reduction works as "iron slag," the same being slag from gold and silver reduction works and called "iron slag" from the large percentage of iron it contains. This slag is crushed or broken to the proper size, (varying with the requirements of the work to be done,) and with it I mix a cementing agent, only enough of the latter being used to fill the interstices of the other materials and bind them firmly into a homogeneous mass—that is, my improved composition is composed essentially and substantially of this iron slag (a cementing agent, as asphaltum and some small percentage of other materials)—to aid the cementing together, as more fully hereinafter explained, the resulting pavement being in substance a pavement of this iron slag in contradistinction to an asphaltic pavement proper. This so-called "iron slag" is not the slag from iron furnaces nor from the reduction or refinement of iron, but is substantially different therefrom. It is the slag or refuse from gold and silver reduction works and is called "iron slag" from the large percentage of iron—varying from thirty-three to fifty per cent.—which it contains, with which is combined a large percentage of silica and smaller percentages of lime, alumina, magnesia, &c. To show its general character and constitution two analyses taken from a number are herewith given.

|  | No. 1. | No. 2. |
|---|---|---|
| Protoxide of iron | 41.11 | 33.80 |
| Silica | 33.37 | 37.13 |
| Lime | 10.77 | 15.88 |
| Alumina | 12.35 | 9.56 |
| Magnesia | 1.97 | 3.39 |
| Silver | .017 | .026 |
|  | 99.587 | 99.786 |

In some instances there are also present small percentages of ferrous oxide, cuprous oxide, and sulphur, either or all. It will be seen that it is essentially, therefore, an iron glass, in which the iron is thoroughly blended and united with the silica, and, while very hard, it is somewhat brittle, grinding away quite readily by attrition, the ground surface having a roughened instead of a smooth polished surface; hence, if used with a cementing material, in even comparatively large pieces, the exposed surfaces wear evenly and equally with the cementing material or matrix, so that such pieces neither project above the general level of the roadway nor are loosened from the embedment, the roadway remaining level and with a smooth surface, yet rough enough to afford a firm foothold to animals traveling thereon. While in mass this material is usually somewhat cellular from the formation of air bubbles or spaces, the material itself is non-porous, contains no water whatever in its composition, and from its structure is incapable of absorbing moisture; hence it can form a perfect union with asphaltum, with which, as a cementing agent, a homogeneous mass may be formed. Using these materials—iron slag and asphaltum—as the bases or essentials of the composition, the composition is compounded of the following materials and in substantially the proportions given: Iron slag, loosely crushed and measured, ninety per cent.; asphalt, crude or commercial, five per cent.; crude petroleum, one to three per cent.; talc, one per cent.; fire-clay, (impure from coal measures,) one per cent.

The slag is crushed to the desired size for the finer composition—for instance, so that it will pass through a twenty-mesh screen—while for a coarser composition it may be in lumps, say such as will pass through one or two inch rings. The slag, talc, clay, and lime are thoroughly mixed together, and the asphalt and petroleum then added, the materials being thoroughly mixed and blended while in a heated state.

It is of course to be understood that the proportions given are not fixed and unvariable, but that they may be varied within certain limits without departing from the spirit of my invention, those proportions given being based on the average constitution of the slag.

The characteristic feature of my invention is that I employ what has heretofore been a waste product, to wit: the slag or residue remaining from reduction of the ores of gold, silver, lead, and copper, and in which, in the usual metallurgical treatment of the raw ores, iron and lime have become incorporated, and, after reduction of these substances, remain in such residues as formed, and therefore differs from the slag of iron-reduction works, inasmuch as in the latter instance all the metallic contents are taken from such ores, while in the former—to which I make claim—all the metallic values outside of gold and silver remain and are a portion of the slag which I utilize; hence its great value for road and side-walk purposes, forming a metallic pavement.

Heretofore the slag from gold and silver reduction works has been mingled with hydraulic cement, and sand, gravel, &c., have been mingled therewith to form a composition for artificial pavements. I therefore make no claim, broadly, to anything contained in such prior invention.

Having thus described my invention, what I claim is—

A composition for paving, &c., consisting of the slag or refuse from gold, silver, copper, and lead reduction works, asphaltum, talc, fire-clay, lime, and petroleum, substantially as described.

In testimony whereof I affix my signature in presence of two witnesses.

GEORGE S. LEE.

Witnesses:
JAMES L. NORRIS,
J. A. RUTHERFORD.